United States Patent

Wang

[11] 4,054,630
[45] Oct. 18, 1977

[54] HOT PIN PARISON INJECTION MOLDING TECHNIQUE

[75] Inventor: James Chi-Hwi Wang, Kendall Park, N.J.

[73] Assignee: American Can Company, Greenwich, Conn.

[21] Appl. No.: 651,272

[22] Filed: Jan. 22, 1976

[51] Int. Cl.² .......................................... B29C 17/07
[52] U.S. Cl. .................................. 264/97; 264/327; 425/526; 425/530; 425/533
[58] Field of Search ................ 264/89, 90, 92, 94, 264/96–99, 327; 425/242 B, 387 B, DIG. 208, DIG. 209, DIG. 213, DIG. 216

[56] References Cited

U.S. PATENT DOCUMENTS

| | | | |
|---|---|---|---|
| 2,331,702 | 10/1943 | Kopitke | 264/97 |
| 2,914,799 | 12/1959 | Canfield | 425/156 |
| 3,137,748 | 6/1964 | Makowski | 264/97 |
| 3,186,028 | 6/1965 | Dobbins et al. | 425/243 |
| 3,321,564 | 5/1967 | Dobbins et al. | 264/97 |
| 3,349,155 | 10/1967 | Valyi | 264/97 |
| 3,412,186 | 11/1968 | Piotrowski | 264/89 |
| 3,740,180 | 6/1973 | Sidur | 425/249 |
| 3,776,991 | 12/1973 | Marcus | 264/89 |
| 3,792,946 | 2/1974 | Zavasnik | 425/242 |
| 3,819,314 | 6/1974 | Marcus | 425/249 |
| 3,934,743 | 1/1976 | McChesney et al. | 264/97 X |
| 3,963,399 | 6/1976 | Zavasnik | 425/387 B X |

*Primary Examiner*—Jan H. Silbaugh
*Attorney, Agent, or Firm*—Robert P. Auber; James W. Bock

[57] ABSTRACT

Parisons for use in making blow molded highly molecularly oriented plastic bottles are injection molded using a cooled cavity and a relatively hot core pin to prevent the formation of residual internal stress in or near the surface of the parison. The pin is maintained at a temperature above the glass transition temperature of the resin to reduce the formation of cracks when the parison is subsequently blow molded in the orientation temperature range.

3 Claims, 5 Drawing Figures

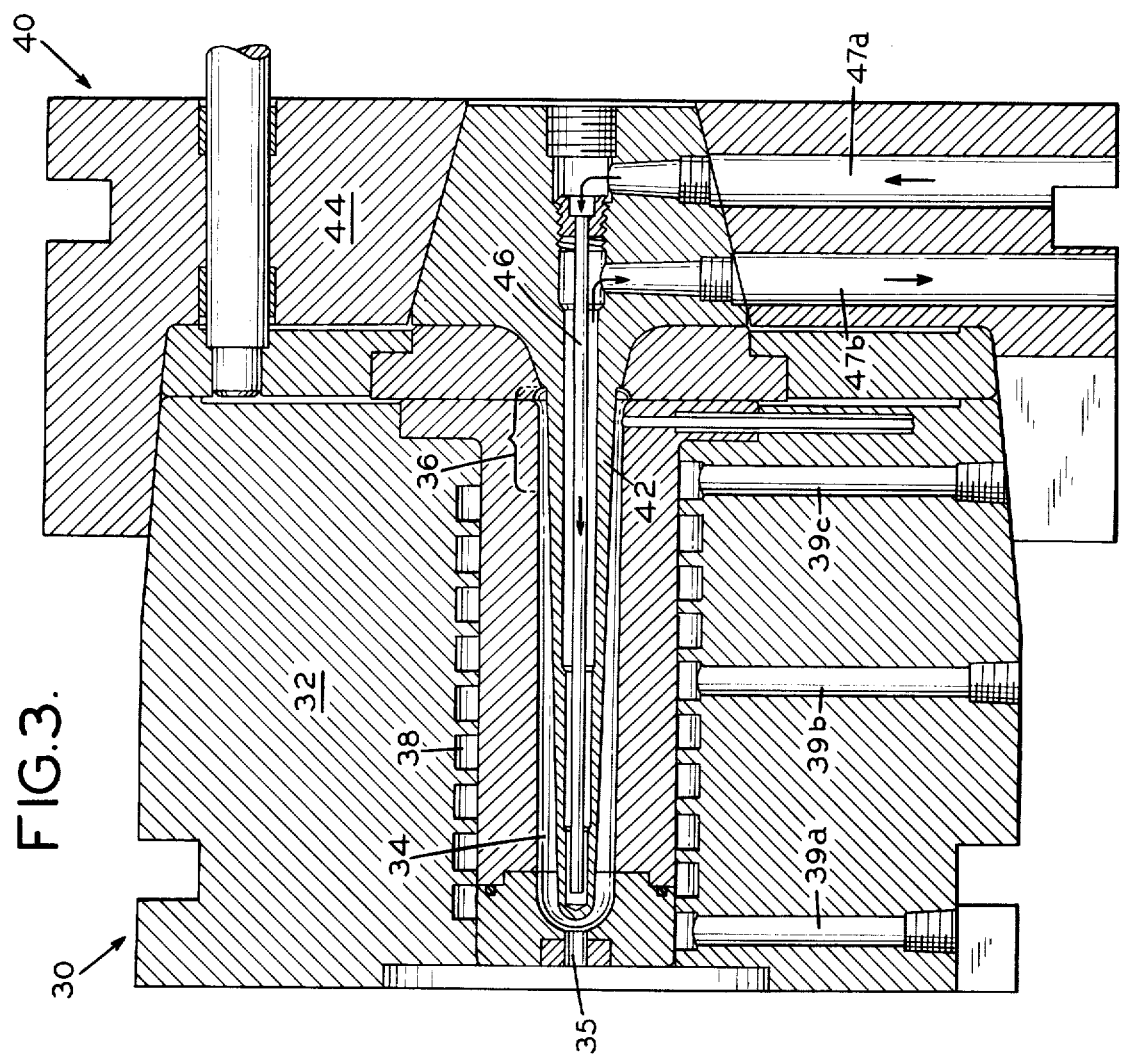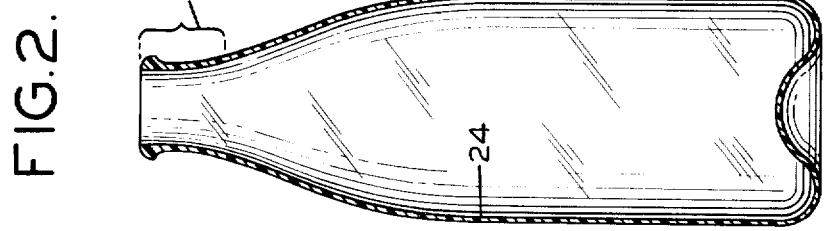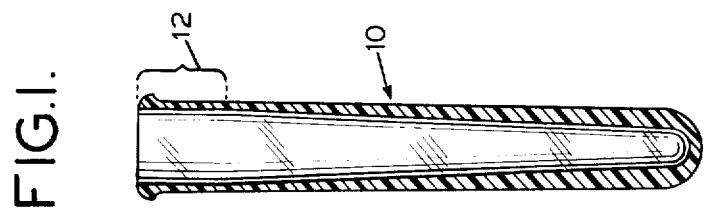

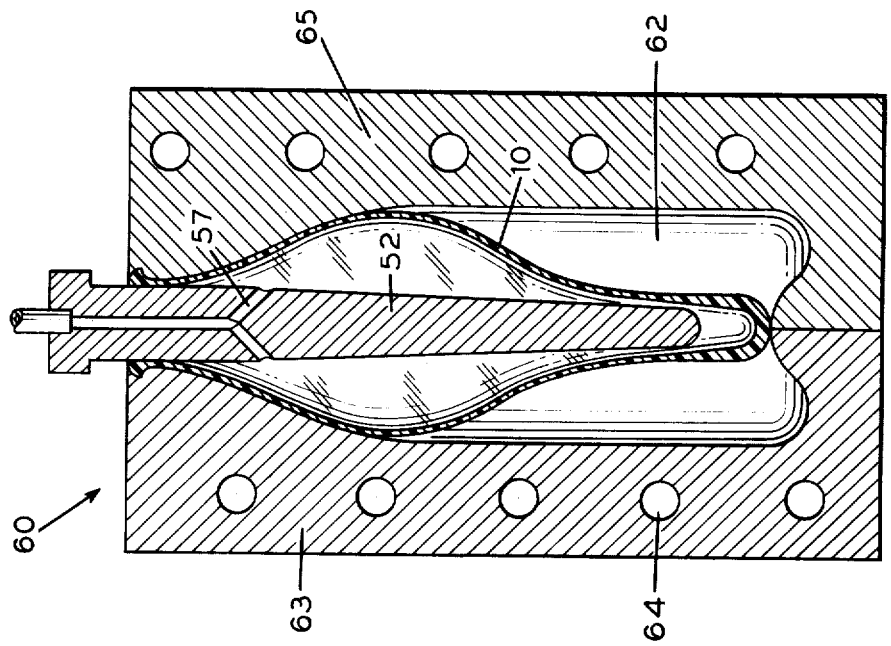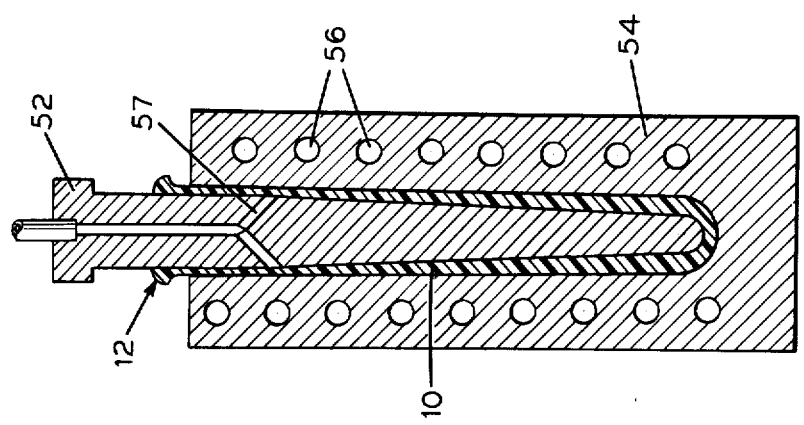

HOT PIN PARISON INJECTION MOLDING TECHNIQUE

BACKGROUND OF THE INVENTION

Blow molded plastic containers are made by forming a parison which is subsequently inflated in a blow mold cavity having the configuration of the container. Parisons have been formed by extrusion and by injection molding. One technique for forming unoriented or low orientation bottles involves injection molding the parison in an injection mold having a core pin on which the parison is retained. The core pin and parison are transferred to a blow mold where pressurized gas (air) is used to inflate the hot parison. The core pin may be maintained at a temperature high enough to insure that the parison remains in a sufficiently soft state for easy inflation. This technique is not economically appropriate for blow molding highly molecularly oriented containers because the parison must be cooled to the orientation temperature range before the bottle can be blown. Another technique involves injection molding parisons in a mold having a cooled cavity and cooled core pin to rapidly solidify the parison. The parison is removed from the mold and stored. Later, the cold parison is reheated and inflated into conformity with a blow mold cavity. The latter process can produce highly molecularly oriented containers if the parison is reheated to an appropriate temperature within the orientation temperature range for the polymer prior to the blow molding step.

Molecular orientation is accomplished by stretching certain polymeric materials at a temperature within the orientation temperature range of the particular polymer. Stretching sheet or film along orthogonal axes produces biaxial orientation. Molecularly oriented materials have improved physical properties including superior impact resistance, increased resistance to creep, increased stiffness, and increased resistance to rupture when compared with the same material in an unoriented state.

Biaxial orientation of blow molded containers may be accomplished by blow molding a parison which is at a temperature within the orientation temperature range of the polymer. A high degree of orientation results in high resistance to creep, but can present problems such as reduced optical clarity, stress whitening, and cracking. The degree of orientation of the container can be measured by a standard test procedure (ASTM D-1504) which yields data in p.s.i. which are representative of the degree of orientation and are referred to as "Orientation Release Stress" (O.R.S.).

For a given polymer and end use application, there is an optimum level of orientation as determined by orientation release stress (ORS), which may be below the maximum possible orientation level. For example, a property which deteriorates with attempts to achieve high levels of orientation is optical transparency. Many polymers crack, craze, stress whiten, show haze or otherwise become unsightly when highly oriented.

The amount of orientation in a container blow molded from a polymeric material is affected by the conditions under which the material is oriented. For example, in a bottle higher levels of circumferential and axial orientation result from increasing the amount of stretch in the circumferential and axial directions, by increasing the stretching rate, and by decreasing the stretching temperature.

For nitrile rubber containing acrylonitrile polymeric materials (such as those polymeric materials disclosed in U.S. Pat. No. 3,426,102 to Solak or U.S. Pat. No. 3,819,762 to Howe) an orientation release stress in the circumferential direction in excess of 500 p.s.i., preferably on the order of 650 p.s.i., provides adequate creep resistance for pressurized beverage bottles having a high container volume to weight ratio. See U.S. Pat. No. 3,786,221 to Silverman, and McChesney et al applications Ser. No. 319,380, now U.S. Pat. No. 3,934,743 597,678 and Ser. No. 516,110, now U.S. Pat. No. 3,984,498, all assigned to the present assignee hereby incorporated by reference. The improvement in physical properties due to orientation also allows the wall thickness of the bottle to be reduced for a savings of polymeric material over that required for a non-oriented bottle.

While it is known to form molecularly oriented nitrile bottles by blow molding an injection molded parison, and such techniques have met with some success, generally they have not been economically practical for carbonated beverage bottles. The reason has been that if the bottle is oriented by stretching sufficiently to develop the properties required of containers for carbonated beverages (assuming a wall thickness thin enough to be economic), stress whitening, crazing or cracking has been observed to occur, making the container unsalable.

Further analysis of this phenomenon has brought the realization that cracking, crazing or stress whitening primarily develop at or near the inner surface portion of the bottle wall. This is due to the fact the the inside of the parison is stretched to a much higher extent, proportionally, than the outside. It has been found that the degree of orientation is not constant across the bottle wall thickness, but on the contrary varies substantially across the wall, and at or near the inner surface portion of the wall is sufficiently high to give rise to these problems.

In an effort to compensate for the difference in stretch between the inside and the outside, a method of heat treatment is disclosed in McChesney et al U.S. Pat. No. 3,934,743 for achieving a more uniform circumferential orientation across the thickness of the bottle sidewall. This is accomplished by imparting a radial temperature gradient to an axial zone of the sidewall of the parison prior to blow molding the parison into a bottle. The inner surface of the parison is made hotter than the outer surface of the parison to offset the difference in stretch.

SUMMARY OF THE INVENTION

Parisons suitable for blow molded, highly oriented containers are injection molded using a die cavity for the external configuration and a coaxial core pin for the internal configuration. Production efficiency requires that the molding cycle time be reduced to a minimum. The molding cycle time can be minimized if the cavity and core pin are cooled by circulating coolant to solidfy the polymer rapidly. As the molten polymer is forced into a conventional cooled cavity and cooled pin injection mold, the polymer contacts the relatively cool cavity and core pin surfaces with a resulting increase in polymer viscosity at and near these mold surfaces and the formation of a solidifying layer on the mold surfaces. The continued addition of molten polymer to complete filling of the mold causes stresses to be developed in this solidifying layer at and near surfaces of the parison, which stresses are retained in the finished parison. Polymers having high viscosity or elasticity or both in the melt processing temperature range are susceptable to high residual stresses in the molded article. The later deliberately induced molecular orientation stresses add to these mold induced residual stresses. The higher degree of stretching of the inner surface of the container during blow molding coupled with the injection mold induced residual stresses, particularly those stresses at or near the inner surface of the parison, leads to excessive stress which may manifest as stress whitening, crazing or cracks in the container. These defects are undesirable because larger cracks may lead to failure by bursting of the container and smaller cracks impair the optical quality of the container by causing hazy or other poor appearance areas in the container wall. As a consequence, a container can not be oriented to the extent at which these defects appear. A higher degree of orientation could be achieved if these defects could be avoided.

According to the present invention, stress cracks in the inner portion of the wall of an oriented, blow molded container are significantly reduced or eliminated by modifying the manner in which the parison is injection molded to reduce or eliminate residual orientation or stress at or near the inner surface portions of the parison. According to the present invention, the core pin of the injection mold is maintained above a temperature at which significant stress will not be retained. The die cavity can be cooled as is conventional for low cycle time since mold-induced residual stress in the outer portions of the parison better can be tolerated in view of the lower degree of stretch which the exterior portions of the container wall undergo during blow molding. The pin is maintained at a temperature well above the glass transition temperature (Tg) of the polymer with the result that the inner portion of the parison remains in a fluid or semi-fluid state during all of the time during which the polymer is injected. Residual stress at or near the inner surface portions is minimized under such conditions.

The cooled die cavity causes rapid solidification of the outer portion of the parison to provide a rigid skin thick enough to provide structural integrity to the parison as it is removed from the mold cavity and core pin to avoid distortion of the molded parison.

In the drawings:

FIG. 1 is a view in cross-section of a parison,

FIG. 2 is a view in cross-section of a bottle blow-molded from the parison of FIG. 1, FIG. 3 is a schematic view in cross-section of the cavity and core pin for injection molding the parison of FIG. 1, FIG. 4 is a schematic view in partial cross-section of the blow mold pin and temperature conditioning chamber for temperature conditioning the parison for biaxial orientation during blow molding, and FIG. 5 is a schematic view in cross-section of the blow molding pin and cavity showing the parison partially blown into the shape of the bottle of FIG. 2.

With reference to the drawings, the parison 10 shown in FIG. 1 is a closed end tube having a configuration appropriate for blow molding a bottle. The parison 10 includes neck finish 12 portion shown in the form employed for a crown cap bottle. The neck finish may have other configurations such as threads for screw caps. The wall thickness varies along the axial length of the parison in accordance with well known principles to provide the appropriate wall thickness in the finished bottle. To encourage more biaxial stretching, the parison can be made shorter in the axial direction than the finished bottle is tall.

The parison 10 is formed in an injection mold shown in FIG. 3. The injection mold comprises an axially reciprocable core pin portion 40 and a fixed die portion 30. The die portion 30 comprises a block 32 having a cavity 34 of the shape of the exterior of the parison 10. The cavity 34 includes a configuration 36 for the neck finish. Heat exchange fluid is circulated through conduits 39a, b, and c to and from channels 38 in the block 32 surrounding the cavity 34 to rapidly cool the exterior of the injection molded parison to between about 30° F and 100° F to impart sufficient rigidity to the parison to facilitate its removal from the injection mold. An injection gate 35 conducts molten polymer at the melt processing temperature into the cavity 34 under high pressure.

The reciprocable portion 40 includes an injection mold core pin 42 having an exterior shape in conformance with the interior of the parison. The pin 42 is supported coaxially of the cavity 34 by a reciprocable ram structure 44. The interior of the pin 42 is hollow and includes a central "fountain" tube 46 in communication with conduit 47a for conducting temperature controlled heat exchange fluid such as oil toward the tip of the pin. The fluid flows back from the tip of the pin outside tube 46 and is exhausted through conduit 47b. The exhausted fluid may be again temperature conditioned and recirculated.

In operation, the injection mold is closed by movement of the pin 42 into the cavity 34. Polymer at melt processing temperature is injected at high pressure into the space between the pin 42 and the cavity 34. The exterior surface of the thus formed parison is cooled by the cold die cavity 34 to impart sufficient rigidity to enable the parison to be ejected from the pin 42 when the mold is opened. Circulating heat exchange fluid maintains the pin 42 at the desired surface temperature.

As is shown in FIG. 4, the molded parison 10 is then transferred to a temperature conditioning station in which it is retained on a temperature conditioning pin 52 in a temperature conditioning cavity 54 having heaters or heat exchange fluid conduits 56. The temperature conditioning pin and cavity closely fit the parison for good heat transfer. The temperature conditioning pin may also include heat exchange fluid channels or heater means (not shown). The temperatures of the conditioning pin 52 and cavity 54 are maintained so as to temperature condition the parison to bring it into a desired temperature gradient within the orientation temperature range to provide molecular orientation when the parison is blow molded. The temperature conditioning pin also includes passages 57 for pressurized gas used to inflate the parison in the subsequent step. Since the interior of the parison will be stretched to a greater extent than the exterior during blow molding, a more uniform orientation throughout the thickness of the wall of the bottle may be achieved by providing the parison with a temperature gradient such that the inside is hotter than the outside. McChesney et al U.S. Pat. No. 3,934,743 and application Ser. No. 597,678, provide more specific disclosures of parison temperature conditions appropriate for molecular orientation during blow molding.

After temperature conditioning, the parison is transferred on the pin 52 to a blow mold 60, shown in FIG. 5, comprising halves 63, 65. The blow mold halves 63, 65 define a cavity 62 having the shape of the finished bottle. Coolant may be circulated through conduit 64 to cool the blow mold cavity surfaces. Air or other pressurized gas is conveyed through passages 57 of pin 52 to inflate the temperature conditioned parison 10, shown partially inflated in FIG. 5. Inflation continues until the stretched parison is forced into contact with the cool walls of the cavity 62 where the polymer is rapidly cooled and rigidified. The mold halves 63, 65 are then separated and the finished bottle removed. Since inflation occurs while the parison is at temperatures within the orientation temperature range and the bottle walls are biaxially stretched, the bottle is thereby biaxially oriented.

The above described procedure involving transfer of the parison from a molding pin to a temperature conditioning station is further described in Belivakici et al application Ser. No. 651,273, assigned to the present assignee, filed on even date herewith, wherein an injection molded parison is promptly transferred to a temperature conditioning and blow pin. Alternatively, the injection molded parison can be stored for later reheat temperature conditioning and blow molding. A further alternative is to utilize the injection molding pin as a blow molding pin by transferring the parison on the pin to a blow molding cavity with or without an intervening pause in a temperature conditioning cavity. The heat exchange fluid circulating through the pin is cycled in temperature between that appropriate for injection molding according to this invention and a lower temperature to cool the parison to the orientation temperature range for blow molding a biaxially oriented container.

Comparison of parisons injection molded with hot core pins with otherwise identical parisons molded with cold core pins reveals a greater concentration of residual stress on the inner surface of the cold pin parisons. A quantitative comparison was made by performing orientation release stress (ORS) tests according to ASTM D-1504 on sections taken from the inner portions of the wall of the parison. A comparison of parisons was also made by measuring the degree of birefringence using polarized light. Higher residual stress levels provide higher birefringence. These two comparison techniques agreed well with each other and demonstrated the reduction in residual stress with increasing mold core pin temperature.

According to the invention, temperature of the pin of the injection mold is preferably the minimum temperature which produces the result of eliminating cracks due to residual stress in the parison when the container is biaxially oriented to a desired ORS during blow molding. Pin temperatures higher than that minimum tend to lengthen the cycle time because the time required to cool the parison to the desired orientation temperature for blowing increases. If the pin temperature is allowed to approach the melt processing temperature, the parisons will tend to adhere to the pin. The lowest pin temperature which avoids cracks is usually the most desirable. For a particular polymer, parison configuration, container configuration and level of orientation, the selection of the injection mold pin temperature is accomplished by adjusting the heat exchange fluid flow rate or temperature until cracks are no longer formed as the container is blow molded. The selected pin temperature can be measured by use of various temperature measuring probes or devices, but is most easily determined using graduated melting point crayons such as those sold under the name TEMPILSTICK by Tempil Corporation, 132 W. 22nd Street, New York 10011, N.Y.

SPECIFIC EXAMPLES

INTRODUCTION

Bottles were blown from seven different polymeric materials. For each polymer, parisons were injection molded at various core pin temperatures. The parisons were temperature conditioned to accomplish high levels of molecular orientation when blown into approximately 10 fluid ounce capacity bottles of a standard shape. The bottles weighed between 22 and 23 gms.

The bottles made from each polymeric material were blow molded in two orientation ranges of about 500 psi and about 650 psi ORS as measured in accordance with ASTM D-1504. A range of injection mold core pin temperatures was employed to determine the pin temperature below which the bottles were susceptible to crazing, haze, stress whitening or cracking. The temperature of the pin was determined within about ± 5° F using TEMPILSTICK crayons. Interpolation of ORS measurements to calculate the minimum pin temperature for a particular polymeric material to produce crack-free bottles may have introduced an error of ± 10° F, which, when coupled with the temperature measurement error of ± 5° F, yields a maximum error of ± 15° F for the minimum pin temperature reported in Table 1.

a. Injection Molding

The polymeric material pellets were molded at a water content of about 0.3%. The parisons were molded to the configuration illustrated in FIG. 1 on a Lombard 75 ton reciprocating screw injection machine, Model 75-6, made by Farrel Company Division, 565 Blossom Rd., Rochester, N.Y. 14610. The screw of the machine was a "PVC" type with a compression ratio of 1.45:1. The mold employed is illustrated in FIG. 3. The molten polymeric material was injected into the mold cavity through a gate 35. The mold die 32 was cooled to as low as 40° F at the closed end of the parison by cold water circulating through conduits 39a, b, c and channels 38. The temperature of the core pin 42 was controlled by hot oil circulating through conduit 47a, through tube 46 and back along the outside of tube 46 to conduit 47b. The total mold cycle time was held between 13 and 18 seconds with actual polymer injection times between 1 and 1½ seconds.

b. Temperature Conditioning

Within 3 to 8 seconds from the opening of the injection mold, the still warm parisons were transferred to a temperature conditioning and blow mold pin 52 shown in FIG. 4. Blow pin 52 closely fitted the interiors of the parisons to establish good heat transfer. Blow pin 52 bearing a parison 10 was placed in a closely fitting thermal conditioning cavity 54. The cavity 54 had five independently temperature regulated zones along the longitudinal axis which zones were heated by hot oil circulating through passages 56. The blow pin temperature was regulated by internal electric heaters. The parisons were each temperature conditioned for a period of time approximating the injection mold cycle (13–18 seconds). The temperatures of the cavity 54 and blow pin 52 were regulated to yield orientation levels of about 500 to 650 psi in the subsequent blow molding step.

c. Blow Molding

At the completion of the temperature conditioning step, the blow pin 52 with the parison 10 retained thereon was transferred from the temperature conditioning cavity 54 to a blow molding station similar to that shown in FIG. 5. The parison was inflated by introducing air under pressure through passages 57 in the blow pin 52. The parisons began to inflate at the upper or finish end and inflation then progressed toward the tip while the inflation air pressure was maintained between 50 and 75 psi. Near the end of the blowing cycle the air pressure was raised to about 150 psi to insure conformance of the bottle with the configuration of the blow mold cavity 52. At the end of the cycle, which required about 16 seconds, the pressure was released and the bottle removed from the mold.

d. Reported Data

The finished bottles were subjected to a test procedure in general accordance with ASTM D-1504 to determine the orientation release stress (ORS) at the upper, lower and middle regions of the sidewall of the available from Monsanto Company, 920 Brown St., Akron, Ohio 44311. Melt flow rate was measured at approximately 162° F above the glass transition temperature (Tg).

Die swell is a measure of polymer melt elasticity. The more elastic the material, the greater the die swell. More elastic materials store more energy and therefore tend to display greater residual stress when injection molded. Die swell is the percentage increase in diameter of the extrudate over the extrusion orifice diameter. Die swell was measured using the Melt Indexer under the same conditions as were used in determining melt flow rate.

Die swell and melt flow rate for each polymer was measured at the same approximately 162° F temperature increase over the glass transition temperature for each polymer in an effort to rely upon the observed similarities of polymer properties when measured at the same temperature in excess of the glass transition temperatures of the polymers.

Glass transition temperatures were measured by the penetration method, using a du Pont Model 943 Thermal Mechanical Analyzer attachment for a du Pont 900 Differential Thermal Analyzer obtained from the Instrument Division, E. I. du Pont de Nemours, Wilmington, Del. 19898. These data are reported in Table I.

TABLE I

| Melt Processing Temp | Polymeric Material | Manufacturer | Approximate Composition | | | Glass Transition Temp. Tg (° F) | Die Swell (%) | Melt Flow Rate | Minimum Injection Mold Core Pin Temperature (° F) | |
|---|---|---|---|---|---|---|---|---|---|---|
| | | | Styrene | Acrylonitrile | Rubber | | | | ORS 500 psi | ORS 650 psi |
| 392° F | Vicobar Lot 429302 | E.I. DuPont de Nemours Plastics Department Wilmington, Delaware 19898 | 20% | 80% | 10 PHR | 210 | 23 | 1.6 | 330 | 350 |
| 392° F | Vicobar Lot 32902 | " | 20% | 80% | 3 PHR | 205 | 18 | 3.3 | 340 | 350 |
| 392° F | Vicobar Lot 33202 | " | 20% | 80% | 0 PHR | 208 | 24 | 7.2 | 350 | 360 |
| 360° F | Experimental Nitrile Resin Lot SW73-0626 | Rohm & Haas, Inc. Philadelphia, Pa. 19105 | 23% | 74% | 0 PHR | 214 | 21 | 2.6 | 300 | 320 |
| 360° F | Barex 210 Lot 309 | Vistron Corporation Midland Building Cleveland, Ohio 44115 | 25% (methyl acrylate) | 75% | 9 PHR | 176 | 21 | 2.5 | 265 | * |
| 380° F | Cycopac 900 | Borg-Warner Chemicals Parkersburg, W. Va. 26101 | yes* | yes* | no* | 208 | 14 | 2.0 | 260 | 260 |
| 395° F | Cycopac 930 | " | yes* | yes* | yes* | 213 | 14 | 1.4 | 260 | 260 |

*Not known or not measured bottle. For each polymeric material the average ORS at the regions most prone to cracking was plotted against core pin temperature. Those data points which represented crack-free bottles were identified and a boundary drawn between clear and cracked bottles. From this plot, the minimum injection mold pin temperature for the chosen orientation levels was determined. The thus determined minimum injection mold pin temperature for crack-free clear bottles at each of two levels of orientation release stress is tabulated in Table I.

Table I also tabulates the sources and, where known, the approximate compositions of various polymeric materials.

The nitrile polymers from which the above bottles were made were examined to determine melt flow rate, die swell, and glass transition temperature. The polymers had a uniform moisture content of 0.3% to minimize variations due to moisture content. The resulting data are reported in Table I.

Melt flow rate was determined according to ASTM D-1238-70, Condition F, on a Model 3504 Melt Indexer From Table I it can be observed that the minimum core pin temperature, for a chosen degree of high orientation, is considerably higher than the glass transition temperature and that higher pin temperatures are required for those polymers which exhibit higher elastic properties in the melt as evidenced by higher die swell.

What is claimed is:

1. A method for making a highly molecularly oriented blow molded container substantially free of stess whitening, crazing, or cracks from polymer material comprising the steps of
forming a seamless, closed ended, tubular parison from the polymeric material in an injection mold comprising a die having a cavity cooled below the glass transition temperature surrounding a coaxial core pin by maintaining the core pin at a temperature, above the glass transition temperature, at which the polymeric material in contact with the pin will remain in a state of at least semi-fluidity throughout injecting of pressurized polymeric material into the die cavity and at which residual stress in the vicinity of the inner surface of the parison is minimized in the polymeric material and injecting pressurized molten polymeric material into the die cavity, temperature conditioning the injection molded parison to within the orientation temperature range for the polymeric material, and inflating the temperature conditioned parison in a blow mold cavity having the configuration of the container to molecularly orient the polymeric material to at least 500 p.s.i. orientation release stress in the circumferential direction and to form the material into the configuration of the container.

2. The method of claim 1 wherein the polymer contains acrylonitrile and styrene or methyl acrylate and the injection mold core pin temperature is maintained in excess of 260° F.

3. The method of claim 1 wherein the injection mold die is cooled to solidify the outside of the parison.

* * * * *